(12) United States Patent
Alonzo (10) Patent No.: US 7,395,892 B2
(45) Date of Patent: Jul. 8, 2008

(54) CYCLE SUSPENSION ASSEMBLY

(75) Inventor: Rolando Cruz Alonzo, Tauranga (NZ)

(73) Assignee: David Evans, Tauranga (NZ)

( * ) Notice: Subject to any disclaimer, the term of this patent is extended or adjusted under 35 U.S.C. 154(b) by 0 days.

(21) Appl. No.: 11/032,219

(22) Filed: Jan. 11, 2005

(65) Prior Publication Data

US 2005/0236804 A1 Oct. 27, 2005

(30) Foreign Application Priority Data

Mar. 23, 2004 (NZ) ..................... 531898

(51) Int. Cl.
*B62D 61/02* (2006.01)
*B62K 3/00* (2006.01)

(52) U.S. Cl. ..................... 180/227; 280/284

(58) Field of Classification Search ............... 280/283, 280/284; 180/227, 231

See application file for complete search history.

(56) References Cited

U.S. PATENT DOCUMENTS

| | | | | |
|---|---|---|---|---|
| 944,795 A * | 12/1909 | Leet et al. | ................. | 280/284 |
| 1,283,030 A * | 10/1918 | Ashton | ................. | 280/284 |
| 3,877,539 A * | 4/1975 | Tilkens | ................. | 180/227 |
| 4,378,857 A * | 4/1983 | Andersson | ................. | 180/227 |
| 4,735,277 A * | 4/1988 | Prince | ................. | 180/227 |
| 5,282,517 A * | 2/1994 | Prince | ................. | 180/227 |
| 5,295,702 A * | 3/1994 | Buell | ................. | 280/284 |
| 5,498,013 A * | 3/1996 | Hwang | ................. | 280/283 |
| 5,509,679 A | 4/1996 | Leitner | ................. | 280/284 |
| 5,611,557 A | 3/1997 | Farris et al. | ................. | 380/275 |
| 5,678,837 A | 10/1997 | Leitner | ................. | 280/284 |
| 5,685,553 A | 11/1997 | Wilcox et al. | ................. | 280/283 |
| 5,725,227 A * | 3/1998 | Mayer | ................. | 280/284 |
| 5,899,480 A | 5/1999 | Leitner | ................. | 280/284 |
| 6,045,470 A | 4/2000 | Wilcox et al. | ................. | 474/78 |
| 6,131,934 A | 10/2000 | Sinclair | ................. | 280/284 |
| 6,164,676 A | 12/2000 | Wilcox | ................. | 280/284 |
| 6,170,845 B1 * | 1/2001 | Tseng | ................. | 280/284 |
| 6,203,042 B1 | 3/2001 | Wilcox | ................. | 280/284 |
| 6,450,520 B1 * | 9/2002 | Girard | ................. | 280/284 |
| 2002/0117830 A1 * | 8/2002 | Holt et al. | ................. | 280/283 |
| 2006/0071444 A1 * | 4/2006 | Griffiths | ................. | 280/283 |

FOREIGN PATENT DOCUMENTS

WO WO01/81159 11/2001

OTHER PUBLICATIONS

Page 76 from Nov. 1998 issue of Mountain Bike www.bcdracing.com, in public use in the U.S. prior to 2000.

\* cited by examiner

*Primary Examiner*—Lesley D. Morris
*Assistant Examiner*—Daniel Yeagley
(74) *Attorney, Agent, or Firm*—Jacobson Holman PLLC (57) ABSTRACT

A two phase bicycle rear suspension assembly. The two phases allow for maximum suspension travel over very uneven terrain. The arrangement is such that when a bicycle fitted with the assembly is being pedalled, the second phase is locked out and lost pedalling energy due to pedal-induced lobbing is avoided, while at the same time the first suspension phase remains active.

26 Claims, 5 Drawing Sheets

CYCLE SUSPENSION ASSEMBLY

FIELD OF THE INVENTION

The present invention relates to suspension assemblies for cycles. More particularly it relates to two-stage suspension assemblies for bicycles.

BACKGROUND TO THE INVENTION

In bicycle suspension design, emphasis is most frequently placed on the stability and equilibrium of the cyclist. Most designs aiming at this objective therefore create suspensions that are "plush" or soft, so that the suspension is responsive to uneven terrain over which the bicycle is pedalled. Suspension designs have also aimed at increasing the degree of suspension travel, that is, the extent of displacement available for the wheel relative to the frame.

However, it is recognised that softer suspension characteristics and/or high suspension travel designs have a drawback. When a cyclist is pedalling, all of the human pedalling energy dissipated in pedalling should ideally be transmitted to the rear wheel of the cycle. In practice, some energy is lost in the conversion of pedal rotation through the chain to the rear wheel. Where soft suspensions are placed adjacent in the rear wheel, it is common for the suspension to compress under the pedalling energy, thus robbing even more pedalling energy. The compression and expansion of the soft suspension, and the resulting motion of the rear wheel in rhythm with the pedalling motion is commonly known as "pedal-induced bobbing".

U.S. Pat. No. 6,131,934 to Sinclair describes a bicycle rear suspension employing two shock absorbers. The Sinclair design is directed especially for downhill racing bicycles where the rear suspensions are subjected to large impact forces that may cause the rear suspension to "bottom out". On the other hand, a stiffer rear suspension can handle large impact forces, but loses the ability to tract smaller "stutter" lumps. To address this, Sinclair uses two spring and damper assemblies, where a soft primary spring and damper assembly is designed to absorb most impacts and a stiffer secondary spring and damper assembly comes into effect to handle larger impacts. Because there is no provision make to prevent the spring and damper assemblies from compressing under pedalling force, the Sinclair design is also susceptible to pedal-induced bobbing.

I have designed a two-stage suspension arrangement using two suspension elements, such as shock absorbers, that can provide maximum suspension travel when the cyclist is not pedalling and to provide minimum suspension travel when pedalling forces are applied. This allows the suspension assembly to absorb impact forces efficiently while not suffering the extent of pedal-induced bobbing of common suspension design.

Accordingly, it is an object of this invention to go some way to achieving this desideratum or to at least provide the public with an effective alternative.

SUMMARY OF THE INVENTION

The invention broadly consists in a two-stage suspension assembly having a driven wheel rotatably mounted thereon, for use on cycle frame having a pedal assembly mounted thereon, the suspension assembly being pivotally mounted on the frame, there being an endless flexible driving linkage between the pedal assembly and the driven wheel, the suspension assembly comprising:

a first stage resiliently linked to the main frame so as to allow a first degree of driven wheel travel whereby the driven wheel may be displaced upwardly relative to the surface it is travelling over without substantially increasing the distance between the driven wheel and the pedal assembly, and a second stage resiliently linked to the main frame and pivotally linked to the first stage so as to allow a second degree of driven wheel travel whereby the driven wheel may be displaced a further distance upwardly relative to the surface it is riding over and whereby the distance between the axis of rotation of the driven wheel and the pedal assembly may be increased;

wherein, in operation, when no pedalling force is applied to the pedal assembly, both the first and second stages are active, and when pedalling force is applied to the pedal assembly, the second stage is substantially inactivated due to the tension in the flexible linkage between the rear wheel and the pedal assembly.

In one embodiment the first stage comprises:

a swing arm having a wheel end and a frame end;

a support arm having a suspension end and a frame end; and a first shock absorber having a first and second end;

wherein the rear wheel is rotatably mounted on the wheel end of the swing arm; the suspension end of the support arm is pivotally mounted on the swing arm at a first pivot point not adjacent the frame end thereof and the first end of the first shock absorber is mounted on the swing arm at the position other than adjacent the wheel end thereof; and wherein the frame end of the support arm is pivotally mounted on the main frame at a second pivot point adjacent the pedal assembly, and wherein the second end of the first shock absorber is mounted on the main frame at a position not adjacent said pedal assembly.

In another embodiment the second stage comprises:

a second shock absorber having a first end and a second end, wherein the first end of the second shock absorber is mounted on the frame end of the swing arm and the second end of the second shock absorber and the frame end of the support arm are pivotally mounted on the main frame forming the second pivot point adjacent the pedal assembly.

In one embodiment the first end of the first shock absorber is mounted at the first pivot point.

In one embodiment the frame end of the swing arm, the first pivot point and the second pivot point are in a V-shape arrangement, wherein the second pivot point forms the apex of the V.

In one alternative the spring rate of the first shock absorber is different from the spring rate of the second shock absorber.

In another alternative the spring rate of the first shock absorber is the same as the spring rate of the second shock absorber.

In another alternative the displacement provided by the first suspension assembly is less than the displacement provided by the second suspension assembly.

In another alternative the displacement provided by the first suspension assembly is more than the displacement provided by the second suspension assembly.

Another embodiment of the invention is, in combination, a two-stage driven wheel suspension assembly, a cycle frame and a driving assembly;

the suspension assembly comprising:

a swing arm having a wheel end and a frame end, a driven wheel having a hub, being mounted on the wheel end of the swing arm;

a support arm having a suspension end and a frame end, pivotally mounted at its frame end on the cycle frame and pivotally mounted at or adjacent to its suspension end on the swing arm at a position not adjacent either the wheel end or the frame end thereof, a first shock absorber having one end mounted either on the support arm at or adjacent its suspension end or on the swing arm, and its other end mounted on the cycle frame, and a second shock absorber having one end mounted on the frame at or adjacent to the frame end of the support arm and its other end mounted on the swing arm, adjacent the frame end thereof;

the driving assembly comprising:

a pedal driven sprocket or pulley wheel mounted on the cycle frame adjacent to the position where the frame end of the support arm is mounted, a drive receiving sprocket or pulley wheel forming a part of the hub of the driven wheel, a flexible endless linkage between the pedal driven and the drive receiving sprockets or pulley wheels, means associated with the pedal driven and drive receiving sprockets or pulley wheels allowing for slack in the endless linkage when the pedal driven sprocket or pulley wheel is not being pedalled;

whereby, in use, when the pedal driven sprocket or pulley wheel is at rest, in a first stage, when absorbing riding surface impact forces on the driven wheel, the support arm pivots on the frame in a direction to compress the first shock absorber against the frame, and in a second stage, when absorbing further riding surface impact forces on the driven wheel, the swing arm pivots relative to the support arm so that its frame end compresses the second shock absorber against the frame; and when the pedal driven sprocket or pulley wheel is being driven, in a first stage, when absorbing riding surface impact forces on the driven wheel, the support arm pivots on the frame in a direction to compress the first shock absorber against the frame, and in a second stage, driving tension in the endless linkage imparted onto the driven wheel hub pivots the swing arm relative to the support arm in a direction which extends the second shock absorber away from the frame thereby deactivating its shock absorbing function.

In one alternative there is provided an idler gear mounted on the support arm over which the endless flexible driving linkage is engaged.

One embodiment of the invention is substantially as herein described with reference to FIGS. 1 and 9.

Another embodiment of the invention is substantially as herein described with reference to FIGS. 2A to 2C and 3A to 3C.

Other alternatives of the invention are substantially as described herein with reference to any one of FIGS. 4 to 8.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Preferred forms of the two-stage suspension assembly according to the invention will now be described with reference to the accompanying figures in which.

DETAILED DESCRIPTION OF THE INVENTION

The term "cycle" as used herein refers to pedal driven cycles. Included in this term are bicycles, tricycles, quad-cycles or the like.

The term "shock absorber" as used herein is not limited to a device for damping sudden and rapid motion. It includes cooperating springs and spring assemblies used in cycle suspensions, whereby mechanical coil springs, pneumatic chambers, and hydraulic circuits are utilised individually or in combination.

The term "endless flexible driving linkage" includes not only a conventional endless chain which transmits drive from a pedal driven sprocket to a wheel driving sprocket, but also any other drive transmitting arrangement having a driving and a driven pulley wheel and an endless belt transmitting drive from one to the other.

The term "pedal assembly" includes not only a conventional pedal and sprocket assembly common to bicycles but any other pulley wheel and pedal assembly by which drive may be transmitted through an endless belt to a driven pulley wheel, which in turn drives the cycle on which it is mounted.

The embodiments of the invention illustrated in the drawings illustrate only the main frame and the two-stage suspension assembly. The pedal assembly, wheels and chain are shown in ghost or outline. The sprocket wheels forming a part of pedal assembly, which transmit drive force to the chain to pull the driven wheel, the sprockets on the driven wheel which receive drive force from the chain—including shifting mechanisms and devices that take up chain slack are conventional to the art and are not included.

Construction

Figure 1:
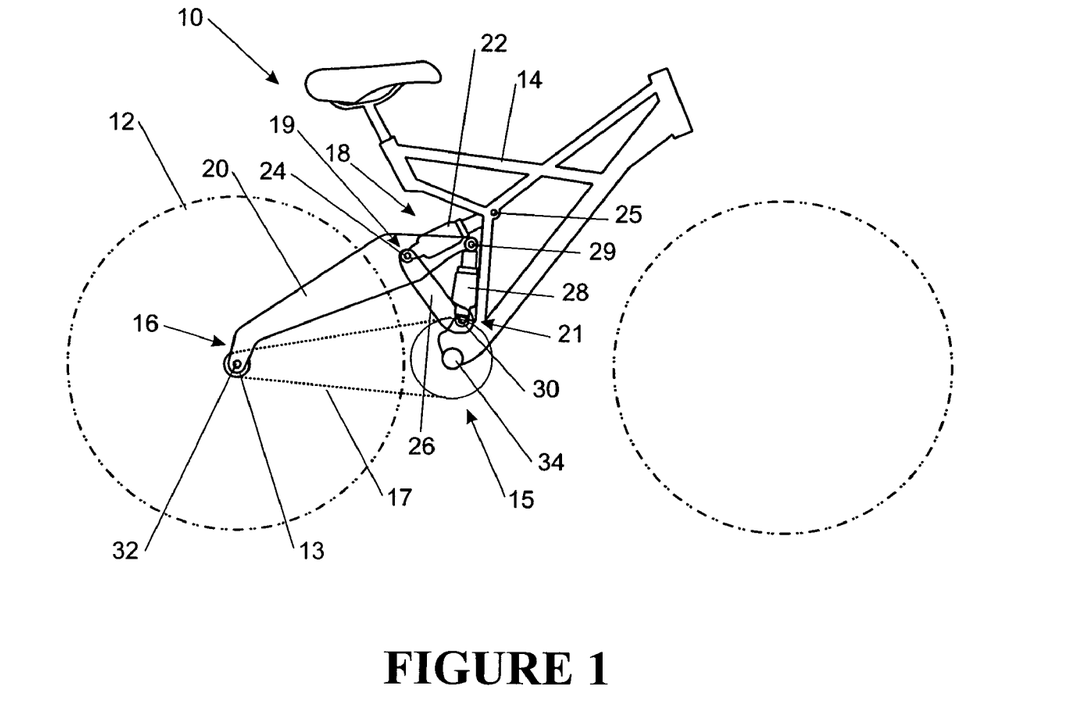
FIG. 1 is a side view of a bicycle frame incorporating a two-stage suspension assembly according to a first embodiment of the invention.

In FIG. 1, the two-stage suspension assembly is shown generally by the arrow 10. The rear or driven wheel 12 is mounted on suspension assembly 10. The suspension assembly 10 is pivotally mounted on main frame 14. A pedal assembly 15 is mounted on frame 14. A driven sprocket 13 forms a part of the hub of rear wheel 12. Chain 17 is mounted on sprocket 13 of pedal assembly 15. The axis of rotation of sprocket 13 is shown as 32. That of pedal assembly 15 is shown as 34.

The embodiment in FIG. 1 shows the suspension assembly 10 on a mountain bike main frame 14. The suspension assembly 10 may similarly be installed onto other pedalling-based cycles, such as, but not limited to, road bikes, tandem bikes, freestyle bicycles, bicycle motocross (BMX) and recumbent vehicles with two wheels or more.

The suspension assembly 10 comprises a swing arm 20, a support arm 26 such as a boss link, and a first shock absorber 22. The swing arm 20 has a wheel end 16, where the rear wheel 12 is rotatably mounted, and a frame end 18. The support arm 26 has a suspension end 19 and a frame end 21. The suspension end 19 of the support arm 26 and one end of the first shock absorber 22 are mounted on swing arm 20 at a first pivot point 24. Pivot point 24 is remote from both the wheel end 16 and the frame end 18, but its precise location can be varied according to the lengths of travel desired in first and second shock absorbers 22 and 28. The other end of the first shock absorber 22 is mounted at mounting point 25 on main frame 14. The frame end 21 of supporting arm 26 is pivotally mounted on main frame 14 at a second pivot point 30 adjacent the pedal assembly 15.

The mounting position of second pivot point 30 on the main frame 14 can be altered to suit the level of shock absorbance required or to adapt the suspension assembly 10 to a variety of bicycle frames, which may have different frame structures.

Second shock absorber 28 is pivotally mounted at one end on main frame 14 at second pivot point 30. The other end of the second shock absorber 28 is pivotally mounted on swing arm 20 adjacent its frame end 18 at pivot point 29.

The construction of the second embodiment of the invention illustrated in FIGS. 2A to 2C and 3A to 3C is substantially the same as the one in FIG. 1. The shock absorbers 22 and 28 are shown with coil springs in this embodiment. The structure of the main frame 14 is also different to that shown in FIG. 1. To adapt the suspension assembly 10 to this frame 14, the mounting point 25 of the first shock absorber 22 on the main frame 14 has been shifted further up the bicycle main frame 14. This one is an example of a typical adjustment or tuning that can be carried out by persons skilled in the art when adapting the suspension assembly 10 to other pedal-driven cycles.

Various tuning options are available for the two-stage suspension assembly as described above. In one option, the shock resistance of the first shock absorber may be different to the shock resistance of the second shock absorber. In another option, the shock resistances could be substantially similar. Different types of shock absorbers may be utilised in each of the first and second stages. Either coil-shock or air-shock absorbing units may be utilised in matched pairs or in unmatched combinations. Furthermore, a short travel shock absorber could be employed in the first stage, so that the likelihood of pedalling energy being dissipated through pedal-induced bobbing in the first stage can be further reduced, if required.

Figure 4:
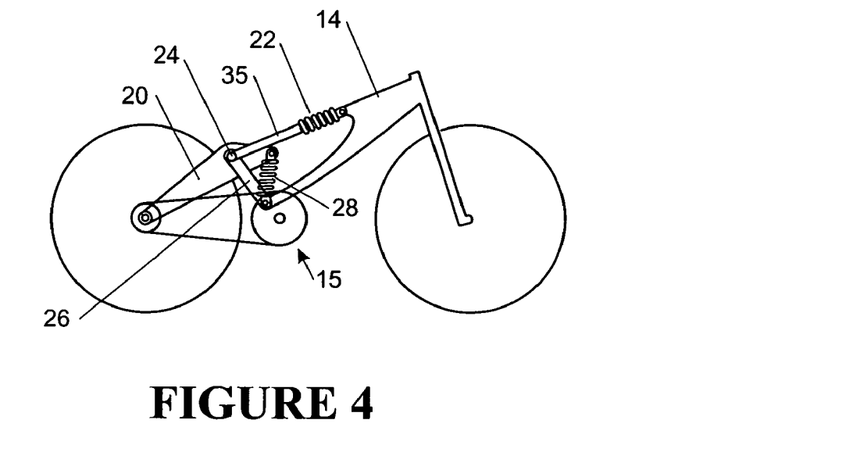
FIG. 4 is a side view of another alternative construction according to the invention.

In the embodiment in FIG. 4 an extension strut 35 is used to allow the relocation of the first shock absorber 22 to an alternative position while still keeping its first end intrinsically mounted on pivot point 24. This will permit narrower designs for the swing arm 20, and alternative designs for the main frame 14. When extension strut 35 is forked it will also allow uninterrupted seat tubes to be incorporated into the main frame 14 design, if required.

Figure 5:
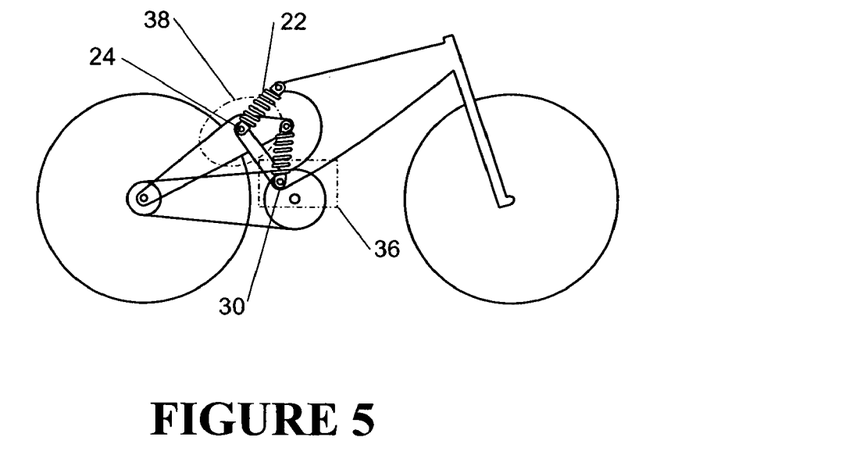
FIG. 5 is a side view of the embodiment shown in FIGS. 2A to 2C and 3A to 3C showing alternative pivot point areas.

As shown in FIG. 5, pivot points 30 and 24 may be relocated anywhere within their respective variable areas of constraint. The first stage pivot 30 may be relocated anywhere inside the dotted square area 36 adjacent pedal assembly 15, and the second stage pivot 24 anywhere inside the dotted elliptical area 38.

Figure 6:
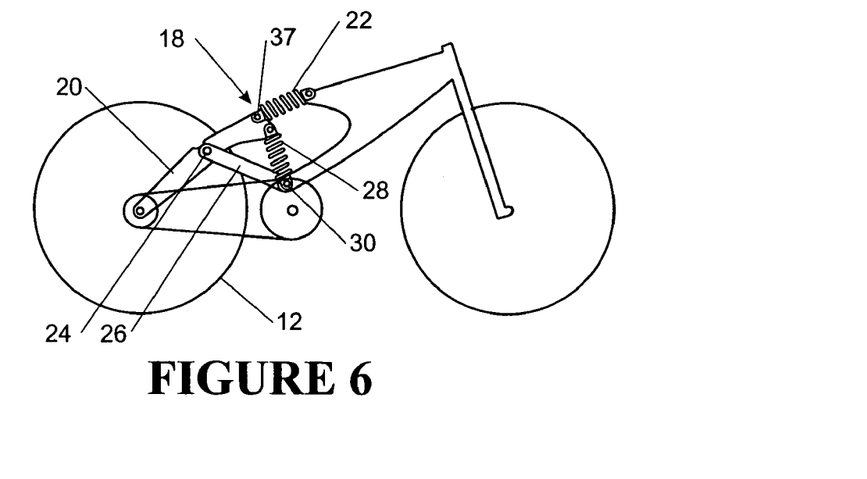
FIGS. 6 to 8 are side views of other alternative constructions according to the invention.
Figure 7:
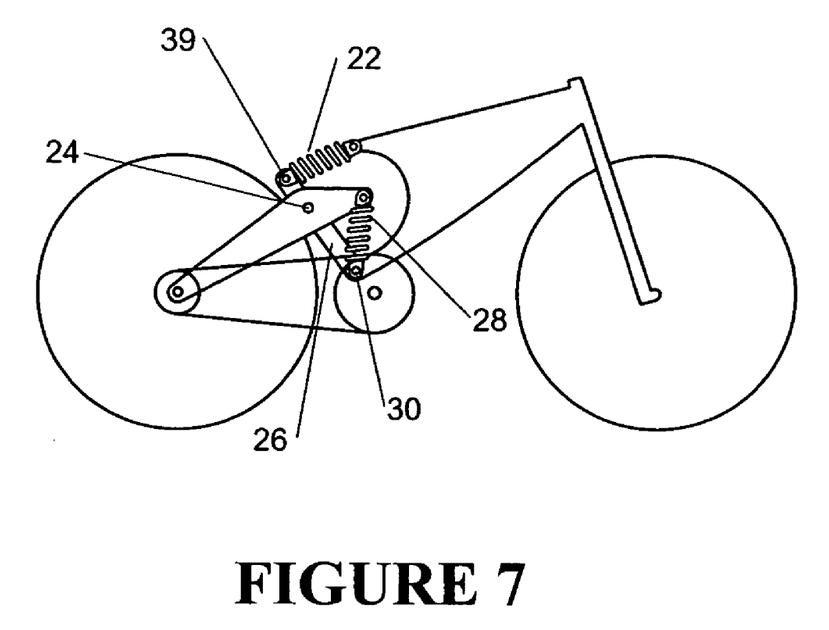
Figure 8:
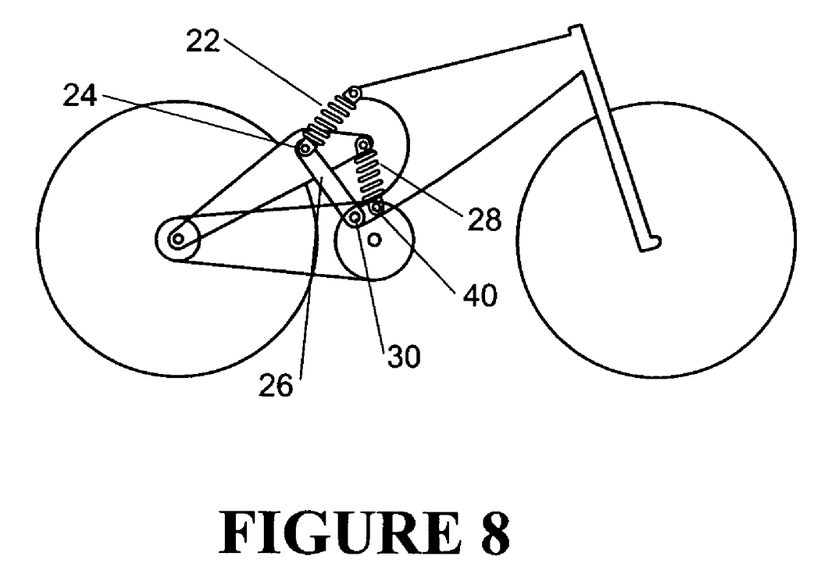

Changing the pivot point locations will allow various alternative linkage ratios in order to achieve specialized suspension characteristics, as depicted in FIGS. 6 to 8.

The embodiment in FIG. 6 is one variant example of the invention when pivot points and shock absorber mounting points are relocated. In this design, the second stage pivot point 24 has been relocated further back along swing arm 20. The support arm 26 is forked in order to clear the rear wheel 12. The first end of the first shock absorber 22 has been removed from its original mounting point 24 and relocated to a new point 37 at the top-forward end of a reconfigured swing arm 20. This configuration has a lower linkage ratio and the relationship between the first 22 and second 28 shock absorbing units becomes more sequential rather than simultaneous in behaviour. This embodiment reduces the overall wheel travel, but further accentuates pedaling efficiency. This variant functions in exactly the same manner as the embodiments shown in FIGS. 1 to 3.

The embodiment in FIG. 7 is another variant of the invention. Support arm 26 extends beyond pivot point 24 where it ends in the other embodiments shown. The first end of the first shock absorber 22 has been removed from its original mounting point 24 (shown in FIGS. 1 to 4) and relocated to a new mounting point 39 on the extended upper portion of the support arm 26.

In the embodiment in FIG. 8 the bottom end of the second shock absorber 28 has been removed from its original mounting point 30 (illustrated in FIGS. 1 to 7) and relocated at a new mounting point 40 on the main frame 14, adjacent to the mounting point 30 of support arm 26.

The embodiments in FIGS. 6, 7 and 8 are further examples of the variable areas of constraint depicted in FIG. 5. Any combination of two or more variant examples from FIGS. 6, 7 and 8 including the use of a strut 35 as shown in FIG. 4, regardless of where the pivot points may be, are also within the scope of the present invention.

Figure 9:
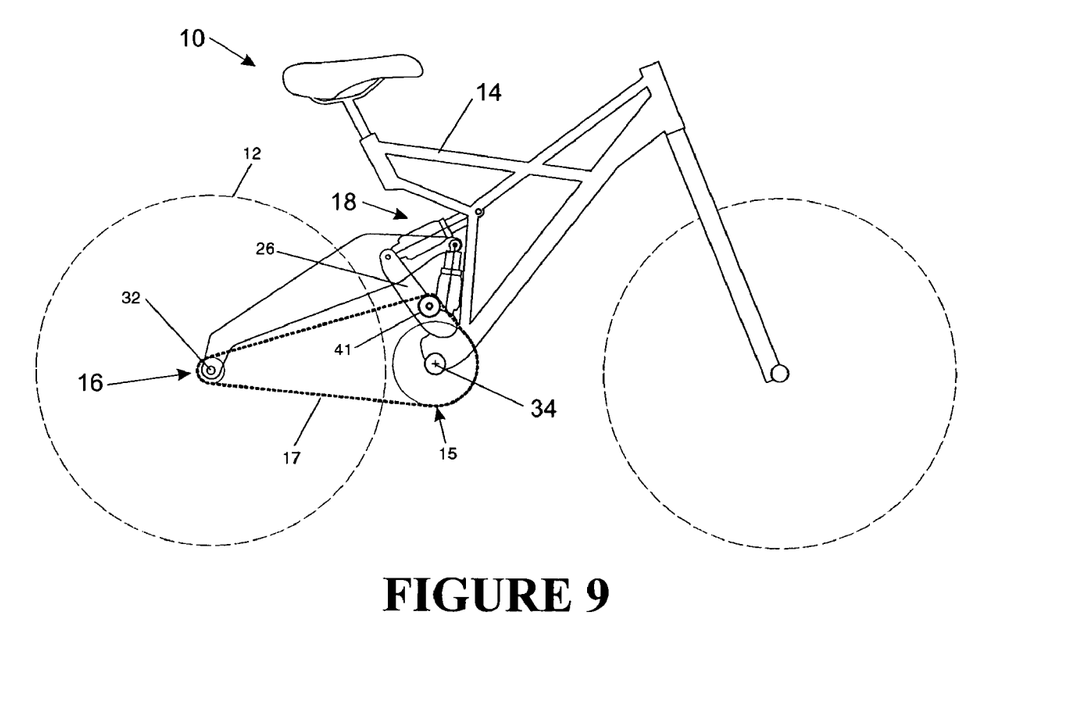
FIG. 9 is a side view of a modification of the embodiment shown in FIG. 1.

In the embodiment shown in FIG. 9 idler gear 41 is rotatably mounted on support arm 26. It is mounted between the pivot points at either end of support arm 26, but the precise location is variable. The upper lap of chain 17 passes over idler gear 41. In a further embodiment idler gear moves inwardly or outwardly along its bearing axis to serve as a front derailleur mechanism if more than one chain ring is utilized in the pedal assembly 15.

Operation

The operation of the two stages of the suspension assembly will now be described with reference to the second embodiment as illustrated in FIGS. 2A to 3C. The other embodiments act in the same way.

Figure 2A:
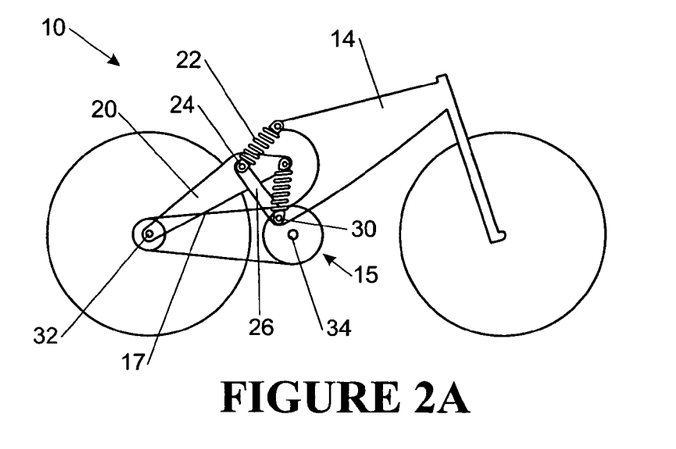
FIGS. 2A to 2C are side views of a bicycle incorporating a two-stage suspension assembly according to another embodiment of the invention, showing the available travel when no pedalling forces are applied.

In the configuration in FIG. 2A the cyclist is not pedalling, allowing the bicycle to roll freely. The bicycle is on even terrain and therefore neither shock absorber 22 in the first stage nor 28 in the second stage is active or compressed.

Figure 2B:
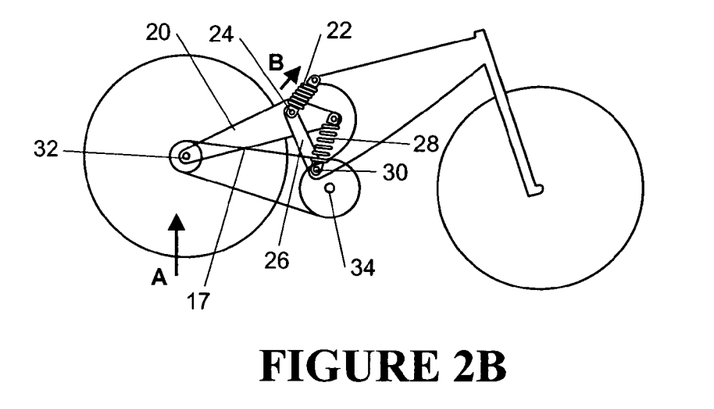

In the configuration in FIG. 2B the cyclist has encountered uneven terrain and an impact force in the direction A acts upon the rear wheel 12. This compresses first shock absorber 22. This results in the upward displacement of wheel 12. Support arm 26 has pivoted clockwise relative to frame 14 about second pivot point 30. At the same time swing arm 20 has moved in the direction of arrow B, but has not itself pivoted in a clockwise direction relative to support arm 26 about pivot point 24. As a result there has been no substantial increase in distance between the rear wheel centre 32 and pedal assembly centre 34. In the preferred embodiment shown, this is achieved by placing the second pivot point 30 relatively close to the centre 34 of the pedal assembly 15, and ideally (but not necessarily) in line and level with the upper lap of the path of chain 17.

In the configuration illustrated in FIG. 2B, the first shock absorber 22 absorbs most of the impact before transferring any remaining impact forces to the second stage. It is possible to design the first stage and the second stage so that they are compressed simultaneously rather than sequentially.

Figure 2C:
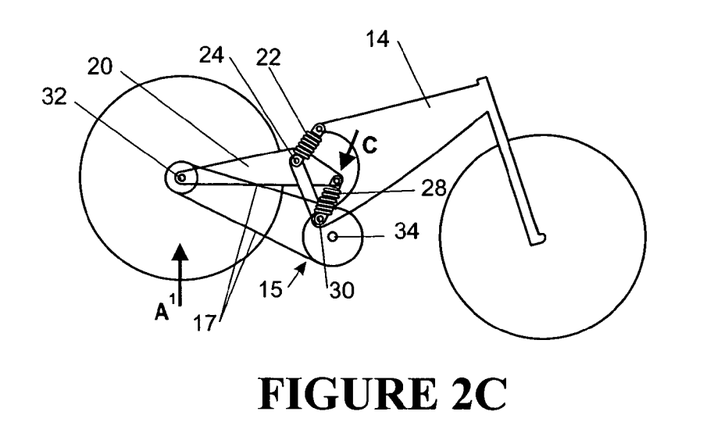

In the second stage configuration in FIG. 2C the second shock absorber 28 is fully compressed. When a greater impact than that shown in FIG. 2B (illustrated by arrow $A^1$ in FIG. 2C) is imparted onto wheel 12 by a bump or raised obstacle, after first shock absorber 22 is fully compressed, support arm 26 cannot pivot any further in a clockwise direction about pivot point 30. At this point, swing arm 20 begins to pivot in a clockwise direction about first pivot point 24, its frame end 18 compressing the second shock absorber 28 (as illustrated by arrow C). Another effect of this pivoting is that the centre 32 of the rear wheel is moved away from the centre 34 of pedal assembly 15. This relative movement can be accommodated by any slack in chain 17 and by the derailer mechanism associated with the hub assembly of the rear wheel or the pedal assembly. The rearward movement of the back wheel 12 during this second stage of operation, adds stability because it maintains the length of the bicycle's wheel base during extreme situations where the front suspension (not shown) becomes fully compressed—which moves the front wheel relatively rearward. The back wheel 12 also moves further away from the saddle (and cyclist) during the latter end of its travel therefore avoiding hazardous contact with the cyclist, which may occur in many conventional long-travel suspension designs.

Figure 3A:
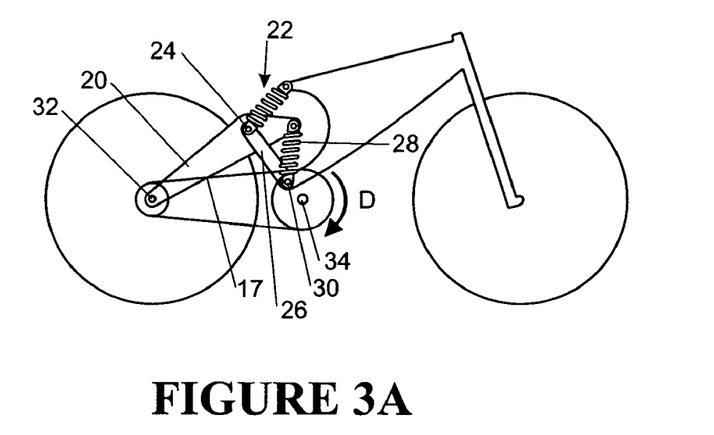
FIGS. 3A to 3C are side views of the two-stage suspension assembly of the embodiment in FIGS. 2A to 2C showing the available travel when pedalling forces are applied.

In FIG. 3A, the suspension assembly 10 is shown in operation on a cycle that is being pedalled. The chain 17 is being driven in the direction of arrow D. There are no impact forces being absorbed in the configuration of this figure and neither the first shock absorber 22 nor the second shock absorber 28 is compressed.

Figure 3B:
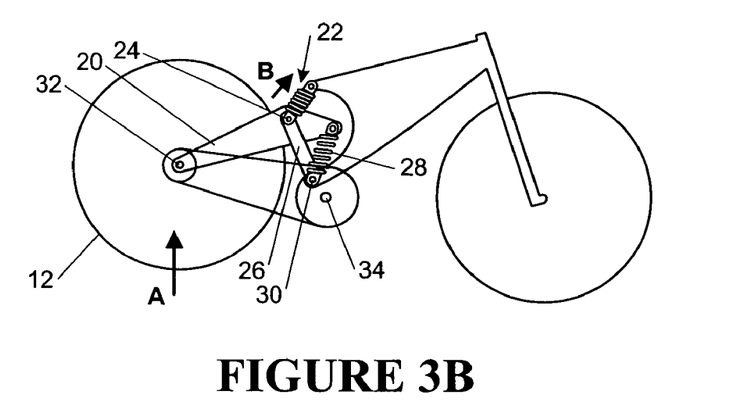

The configuration illustrated in FIG. 3B is identical to that in FIG. 2A. Impact forces in the direction of arrow A have pivoted the support arm 26 in the direction of arrow B. When shock absorber 22 has reached the end of its travel the support arm 26 cannot pivot any further in a clockwise direction about pivot point 30. Shock absorber 28 remains extended.

Figure 3C:
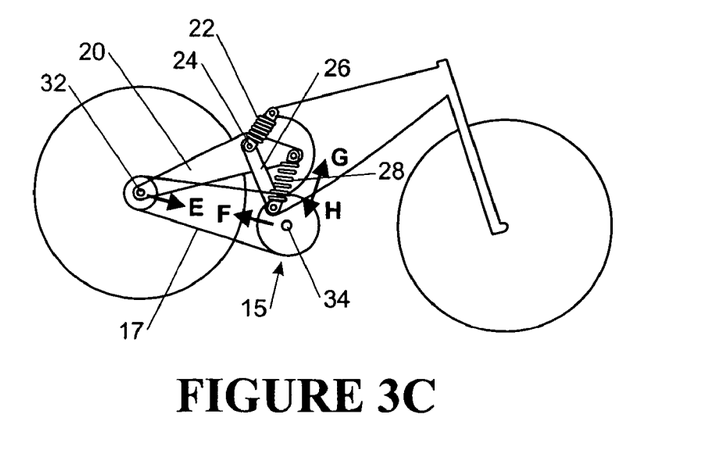

FIG. 3C illustrates how the anti-bob mechanism operates when a cyclist is pedalling. When a cyclist is pedalling, any slack in the upper lap of chain 17 is taken up. The pedalling force causes the centre 32 of the rear wheel to be pulled in the direction of the centre 34 of pedal assembly 15 as illustrated by the arrows E and F. This in turn has the effect of pivoting swing arm 20 in a counter-clockwise direction about pivot point 24. This, at the same time, has the effect of pulling the ends of second shock absorber 28 apart (illustrated by the arrow G-H) to the limit of their travel. By this means the second stage of the suspension assembly is inactivated.

It will be seen that in the configuration shown in FIG. 3C the pedalling force imparted by the cyclist is applied to the chain 17 to drive the wheel 12. None of the pedalling force is applied to second stage of the suspension because the action of pedalling inactivates the second shock absorber 28 in the manner just described.

The purpose of idler gear 41 shown in FIG. 9 is to minimise chain stretch. Chain stretch is the length variance of the load bearing, top portion of chain 17 when the bicycle is being pedalled while it simultaneously goes through its suspension movement. While the distance between the axis of wheel rotation 32 and the axis of rotation of the pedal assembly 34 still does increase during the operation of the second stage, idler gear 41 minimises chain stretch. One consequence of chain stretch is that when a rider pedals while the second stage moves toward its fully contracted position (as in FIG. 2c) this results in a back-pedal sensation from the pedal, which is considered undesirable by some riders.

The main advantage the suspension of the invention is to increase the amount of wheel travel and shock absorption plushness in a bicycle rear suspension—but at the same time achieving a high and practical level of pedalling efficiency, whether the cyclist is in a sitting or standing position. This is achieved by harnessing a compounded characteristic from two co-dependent suspension stages, each with their respective shock absorber unit and linkage movements, whereby the dominant behaviour of either stage may be selected by the application or withdrawal of pedal drive force. The transition between stages is seamless and essentially automatic, not requiring further decisions or switching operations from the rider when in use. The invention is most useful for (but not restricted to) bicycles requiring extremely long suspension travel.

Various tuning options are available for the two-stage suspension assembly as described above. In one option, the shock resistance of the first shock absorber may be different to the shock resistance of the second shock absorber. In another option, the shock resistances could be substantially similar. Furthermore, different forms of the shock absorbers may be utilised in each of the first and second stages. For example, a short travel shock absorber could be employed in the first stage, so that there is a reduced likelihood of pedalling energy being dissipated through pedal-induced bobbing in the first stage.

The foregoing describes the invention including preferred forms thereof. Alterations and modifications as will be obvious to those skilled in the art are intended to be incorporated within the scope hereof.

The invention claimed is:

1. A two-stage suspension assembly having a driven wheel rotatably mounted thereon, for use on a main cycle frame having a pedal assembly mounted thereon, the driven wheel and pedal assembly each having an axis of rotation and a distance between them, the suspension assembly being pivotally mounted on the main cycle frame, there being an endless flexible driving linkage between the pedal assembly and the driven wheel, the suspension assembly comprising:

a first stage resiliently linked to the main cycle frame so as to allow a first degree of driven wheel travel, the driven wheel being displaceable upwardly relative to a surface the driven wheel is traveling over without substantially increasing the distance between the driven wheel and the pedal assembly, and a second stage resiliently linked to the main cycle frame and pivotally linked to the first stage so as to allow a second degree of driven wheel travel, the driven wheel being displaceable a further distance upwardly relative to the surface the driven wheel is riding over and the distance between an axis of rotation of the driven wheel and the pedal assembly being increased;

both the first and second stages being active when no pedalling force is applied to the pedal assembly, and the second stage being substantially inactivated when pedalling force is applied to the pedal assembly due to a tension in the flexible linkage between the driven wheel and the pedal assembly, the first stage including:

a swing arm having a wheel end and a frame end;

a support arm having a suspension end and a frame end; and a first shock absorber having a first and second end and a spring rate;

the driven wheel being rotatably mounted on the wheel end of the swing arm; the suspension end of the support arm being pivotally mounted on the swing arm at a first pivot point not adjacent the frame end of the swing arm and the first end of the first shock absorber being mounted on the swing arm at a position other than adjacent the wheel end thereof; and the frame end of the support arm being pivotally mounted on the main frame at a second pivot point adjacent the pedal assembly, and the second end of the first shock absorber being mounted on the main frame at a position not adjacent said pedal assembly, the second stage including a second shock absorber having a first end and a second end, the first end of the second shock absorber being mounted on the frame end of the swing arm and the second end of the second shock absorber and the frame end of the support arm being pivotally mounted on the main frame forming the second pivot point adjacent the pedal assembly, the first end of the first shock absorber being mounted at the first pivot point.

2. The assembly as claimed in claim 1, wherein the frame end of the swing arm, the first pivot point and the second pivot point are in a V-shape arrangement, the second pivot point forms an apex of the V.

3. The assembly as claimed in claim 1, wherein a spring rate of the first shock absorber is different from a spring rate of the second shock absorber.

4. The assembly as claimed in claim 1, wherein a spring rate of the first shock absorber is the same as a spring rate of the second shock absorber.

5. The assembly as claimed in claim 1, wherein a displacement provided by the first stage of the suspension assembly is less than a displacement provided by the second stage of the suspension assembly.

6. The assembly as claimed in claim 1, wherein a displacement provided by the first stage of the suspension assembly is more than a displacement provided by the second stage of the suspension assembly.

7. In combination, a two-stage driven wheel suspension assembly, a cycle frame and a driving assembly, the suspension assembly comprising:

a swing arm having a wheel end and a frame end, a driven wheel having a hub, being mounted on the wheel end of the swing arm;

a support arm having a suspension end and a frame end, the frame end of the support arm being pivotally mounted on the cycle frame, and the suspension end of the support arm being pivotally mounted on the swing arm at a position not adjacent either the wheel end or the frame end of the swing arm, a first shock absorber, one end of the first shock absorber being mounted on the support arm at the suspension end of the support arm, and the other end of the first shock absorber being mounted on the cycle frame, and a second shock absorber having one end mounted on the frame adjacent to the frame end of the support arm and the other end of the second shock absorber being mounted on the swing arm, adjacent the frame end of the swing arm;

the driving assembly comprising:

a pedal driven sprocket or pulley wheel mounted on the cycle frame adjacent to a position where the frame end of the support arm is mounted, a drive receiving sprocket or pulley wheel forming a part of the hub of the driven wheel, a flexible endless driving linkage between the pedal driven and the drive receiving sprockets or pulley wheels, means associated with the pedal driven and drive receiving sprockets or pulley wheels allowing for slack in the endless linkage when the pedal driven sprocket or pulley wheel is not being pedalled;

whereby, in use, when the pedal driven sprocket or pulley wheel is at rest, in a first stage, when absorbing riding surface impact forces on the driven wheel, the support arm pivots on the frame in a direction to compress the first shock absorber against the frame, and in a second stage, when absorbing further riding surface impact forces on the driven wheel, the swing arm pivots relative to the support arm so that the frame end of the swing arm compresses the second shock absorber against the frame; and when the pedal driven sprocket or pulley wheel is being driven, in a first stage, when absorbing riding surface impact forces on the driven wheel, the support arm pivots on the frame in a direction to compress the first shock absorber against the frame, and in a second stage, driving tension in the endless linkage imparted onto the driven wheel hub pivots the swing arm relative to the support arm in a direction which extends the second shock absorber away from the frame thereby deactivating a shock absorbing function of the second shock absorber.

8. The combination as claimed in claim 7, wherein the suspension end of the support arm is mounted on the swing arm.

9. The combination as claimed in claim 7, wherein in the driving assembly the endless linkage is a bicycle chain mounted over the pedal driven sprocket and the drive receiving sprocket.

10. The combination as claimed in claim 7, wherein a spring rate of the first shock absorber is different from a spring rate of the second shock absorber.

11. The combination as claimed in claim 7, wherein a spring rate of the first shock absorber is the same as a spring rate of the second shock absorber.

12. The combination as claimed in claim 7, wherein a displacement provided by the first stage is less than a displacement provided by the second stage.

13. A two-stage suspension assembly having a driven wheel rotatably mounted thereon, for use on a main cycle frame having a pedal assembly mounted thereon, the driven wheel and pedal assembly each having an axis of rotation and a distance between them, the suspension assembly being pivotally mounted on the main cycle frame, there being an endless flexible driving linkage between the pedal assembly and the driven wheel, the suspension assembly comprising:

a first stage resiliently linked to the main cycle frame so as to allow a first degree of driven wheel travel, the driven wheel being displaceable upwardly relative to a surface the driven wheel is traveling over without substantially increasing the distance between the driven wheel and the pedal assembly, and a second stage resiliently linked to the main cycle frame and pivotally linked to the first stage so as to allow a second degree of driven wheel travel, the driven wheel being displaceable a further distance upwardly relative to the surface the driven wheel is riding over and the distance between an axis of rotation of the driven wheel and the pedal assembly being increased;

the first stage including:

a swing arm having a wheel end and a frame end;

a support arm having a suspension end and a frame end; and a first shock absorber having a first and second end;

the driven wheel being rotatably mounted on the wheel end of the swing arm;

the suspension end of the support arm being pivotally mounted on the swing arm at a first pivot point not adjacent the frame end of the swing arm, and the first end of the first shock absorber being mounted either on the support arm at the suspension end of the support arm or on the swing arm at the first pivot point, the frame end of the support arm being pivotally mounted on the main frame at a second pivot point adjacent the pedal assembly, and the second end of the first shock absorber being mounted on the main frame at a position not adjacent said pedal assembly, the second stage including a second shock absorber having a first end and a second end, wherein the first end of the second shock absorber is mounted on the frame end of the swing arm and the second end of the second shock absorber is pivotally mounted on the main frame at the second pivot such that the second shock absorber and the support arm share a pivot axis, both the first and second stages being active when no pedalling force is applied to the pedal assembly, with the second shock absorber configured so that generally the second shock absorber compresses after the first shock absorber, and the first stage remaining active but the second stage being substantially inactivated when pedalling force is applied to the pedal assembly due to a tension in the flexible linkage between the driven wheel and the pedal assembly.

14. The assembly as claimed in claim 13, wherein the frame end of the swing arm, the first pivot point and the second pivot point are in a V-shape arrangement, the second pivot point forming an apex of the V.

15. The assembly as claimed in claim 13, wherein a spring rate of the first shock absorber is different from a spring rate of the second shock absorber.

16. The assembly as claimed in claim 13, wherein a spring rate of the first shock absorber is the same as a spring rate of the second shock absorber.

17. The assembly as claimed in claim 13, wherein a displacement provided by the first stage of the suspension assembly is less than a displacement provided by the second stage of the suspension assembly.

18. The assembly as claimed in claim 13, wherein a displacement provided by the first stage of the suspension assembly is more than a displacement provided by the second stage of the suspension assembly.

19. In combination, a two-stage driven wheel suspension assembly, a cycle frame and a driving assembly, the suspension assembly comprising:

a swing arm having a wheel end and a frame end, a driven wheel having a hub, being mounted on the wheel end of the swing arm;

a support arm having a suspension end and a frame end, the frame end of the support arm being pivotally mounted on the cycle frame at a support arm pivot, and the suspension end of the support arm being pivotally mounted on the swing arm at a swing arm pivot at a position not adjacent either the wheel end or the frame end of the swing arm, a first shock absorber, one end of the first shock absorber being mounted either on the support arm at the suspension end of the support arm or on the swing arm at the swing arm pivot, and the other end of the first shock absorber being mounted on the cycle frame, and a second shock absorber having one end pivotally mounted on the frame at the support arm pivot such that the support arm and the second shock absorber share a pivot axis, and the other end of the second shock absorber being mounted on the frame end of the swing arm;

the driving assembly comprising:

a pedal driven sprocket or pulley wheel mounted on the cycle frame adjacent to a position where the frame end of the support arm is mounted, a drive receiving sprocket or pulley wheel forming a part of the hub of the driven wheel, a flexible endless driving linkage between the pedal driven and the drive receiving sprockets or pulley wheels, means associated with the pedal driven and drive receiving sprockets or pulley wheels allowing for slack in the endless linkage when the pedal driven sprocket or pulley wheel is not being pedalled;

whereby, in use, when the pedal driven sprocket or pulley wheel is at rest, in a first stage, when absorbing riding surface impact forces on the driven wheel, the support arm pivots on the frame in a direction to compress the first shock absorber against the frame, and in a second stage, when absorbing further riding surface impact forces on the driven wheel, the swing arm pivots relative to the support arm so that the frame end of the swing arm compresses the second shock absorber against the frame, with the second shock absorber configured so that generally the second shock absorber compresses after the first shock absorber; and when the pedal driven sprocket or pulley wheel is being driven when absorbing riding surface impact forces on the driven wheel, the support arm pivots on the frame in a direction to compress the first shock absorber against the frame, and driving tension in the endless linkage imparted onto the driven wheel hub pivots the swing arm relative to the support arm in a direction which extends the second shock absorber away from the frame or which generally holds the second shock absorber in an extended state thereby substantially deactivating a shock absorbing function of the second shock absorber.

20. The combination as claimed in claim 19, wherein the suspension end of the support arm is mounted on the swing arm.

21. The combination as claimed in claim 19, wherein in the driving assembly the endless linkage is a bicycle chain mounted over the pedal driven sprocket and the drive receiving sprocket.

22. The combination as claimed in claim 19, wherein a spring rate of the first shock absorber is different from a spring rate of the second shock absorber.

23. The combination as claimed in claim 19, wherein a spring rate of the first shock absorber is the same as a spring rate of the second shock absorber.

24. The combination as claimed in claim 19, wherein a displacement provided by the first stage is less than a displacement provided by the second stage.

25. The combination as claimed in claim 19, wherein an idler gear is provided on the support arm, the driving linkage engaging the idler gear.

26. The combination as claimed in claim 25, wherein the idler gear is positioned between upper and lower pivots of the support arm.

* * * * *